US005949782A

United States Patent [19]
Wells

[11] Patent Number: 5,949,782
[45] Date of Patent: Sep. 7, 1999

[54] CALL CORRELATION TAG FOR ATM MESSAGES

[75] Inventor: David Wells, Bar Hill, United Kingdom

[73] Assignee: General DataComm, Inc., Middlebury, Conn.

[21] Appl. No.: 08/622,897

[22] Filed: Mar. 29, 1996

[51] Int. Cl.[6] ........................................... H04J 3/12
[52] U.S. Cl. ............................................... 370/395
[58] Field of Search .................................. 370/395, 396, 370/397, 398, 399, 420, 419, 463, 522, 352, 401, 252, 410; 379/114, 115, 116, 117, 118, 119, 120, 121, 122, 123, 124, 125, 126, 127, 133, 134, 139

[56] References Cited

U.S. PATENT DOCUMENTS

| 5,351,286 | 9/1994 | Nici ........................................ 370/352 |
| 5,600,643 | 2/1997 | Robrock, II ............................. 370/399 |
| 5,617,422 | 4/1997 | Litzenberger et al. .................. 370/401 |

OTHER PUBLICATIONS

David Wells, "Proposal for a Call Correlation Tag", ATM Forum, Technical Committee Working Groups, Contribution ATMF/95–0632, on or about Jun. 5, 1995.
Miyazaki, "Q.2726.3 Final Text, Broadband ISDN User Part, Network Call Correlation Identifier", ITU–Telecommunication Standardization Secotro Study Group 11, on or about Jan. 29, 1996.
ITU–T Standards document Q.2931.
ATM Forum Specification UNI–3.1.
ITU–T B–ISUP Signaling Protocols in Standard Q.2761.
ITU–T B–ISUP Signaling Protocols in Standard Q.2762.
ITU–T B–ISUP Signaling Protocols in Standard Q.2763.
ITU–T B–ISUP Signaling Protocols in Standard Q.2764.
BISDN Inter Carrier Interface (B–ICI) Specification Version 2.0 (Integrated), ATM Technical Forum, Dec. 1995.

*Primary Examiner*—Huy D. Vu
*Attorney, Agent, or Firm*—David P. Gordon; David S. Jacobson; Thomas A. Gallagher

[57] ABSTRACT

A processor of an ATM switch is adapted for inserting a call correlation tag (CCT) information element (parameter) into all call initiating messages (e.g., CALL SETUP or INITIAL ADDRESS) of which it is the source. The CCT is unique over a period of time such that two ongoing calls originating at the same interface cannot have the same CCT. The CCT is stored in memory at the ATM switch with other relevant information regarding the call. After the call initiating message is forwarded through the network, the processor of the destination ATM switch obtains the CCT and stores it in memory with other relevant information regarding the call. After the call is terminated, the stored information along with the CCT is forwarded by each processor to a billing management center. According to one preferred aspect of the invention, the CCT assumes the form of a thirty-two bit value contained in an information element (IE). According to another preferred aspect of the invention, other messages such as CONNECT, ADD PARTY REQUEST, and ADD PARTY ACKNOWLEDGE, may also be provided with the same CCT. The invention applies to both UNI and B-ISUP signaling.

20 Claims, 6 Drawing Sheets

SETUP

THIS MESSAGE IS SENT BY THE CALLING USER TO THE NETWORK AND BY THE NETWORK TO THE CALLED USER TO INITIATE CALL ESTABLISHMENT.

MESSAGE TYPE: SETUP
SIGNIFICANCE: GLOBAL
DIRECTION: BOTH

| INFORMATION ELEMENT | REFERENCE | DIRECTION | TYPE | LENGTH |
|---|---|---|---|---|
| PROTOCOL DISCRIMINATOR SETUP | 5.4.2 | BOTH | M | 1 |
| CALL REFERENCE | 5.4.3 | BOTH | M | 4 |
| MESSAGE TYPE | 5.4.4.1 | BOTH | M | 2 |
| MESSAGE LENGTH | 5.4.4.2 | BOTH | M | 2 |
| AAL PARAMETERS | 5.4.5.5 | BOTH | O (1) | 4-21 |
| ATM TRAFFIC DESCRIPTOR | 5.4.5.6 | BOTH | M | 12-30 |
| BROADBAND BEARER CAPABILITY | 5.4.5.7 | BOTH | M | 6-7 |
| BROADBAND HIGH LAYER INFORMATION | 5.4.5.8 | BOTH | O (2) | 4-13 |
| BROADBAND REPEAT INDICATOR | 5.4.5.19 | BOTH | O (3) | 4-5 |
| BROADBAND LOW LAYER INFORMATION | 5.4.5.9 | BOTH | O (4) | 4-17 |
| CALLED PARTY NUMBER | 5.4.5.11 | BOTH | M | (5) |
| CALLED PARTY SUBADDRESS | 5.4.5.12 | BOTH | O (6) | 4-25 |
| CALLING PARTY NUMBER | 5.4.5.13 | BOTH | O (7) | 4-26 |
| CALLING PARTY SUBADDRESS | 5.4.5.14 | BOTH | O (8) | 4-25 |
| CONNECTION IDENTIFIER | 5.4.5.16 | N→U | M | 9 |
| QoS PARAMETER | 5.4.5.18 | BOTH | M | 6 |
| BROADBAND SENDING COMPLETE | 5.4.5.21 | BOTH | O (9) | 4-5 |
| TRANSIT NETWORK SELECTION | 5.4.5.22 | U→N | O (10) | 4-8 |
| ENDPOINT REFERENCE | 5.4.8.1 | BOTH | O (11) | 4-7 |
| CALL CORRELATION TAG | | | | 4 |

NOTE 1- INCLUDED IN THE USER-TO-NETWORK DIRECTION WHEN THE CALLING USER WANTS TO PASS ATM ADAPTATION LAYER PARAMETERS INFORMATION TO THE CALLED USER. INCLUDED IN THE NETWORK-TO-USER DIRECTION IF THE CALLING USER INCLUDED AN ATM ADAPTATION LAYER PARAMETERS INFORMATION ELEMENT IN THE SETUP MESSAGE.

FIG.3

CONNECT

THIS MESSAGE IS SENT BY THE CALLED USER TO THE NETWORK AND BY THE NETWORK TO THE CALLING USER TO INDICATE CALL ACCEPTANCE BY THE CALLED USER.

MESSAGE TYPE: CONNECT
SIGNIFICANCE: GLOBAL
DIRECTION: BOTH

| INFORMATION ELEMENT | REFERENCE | DIRECTION | TYPE | LENGTH |
|---|---|---|---|---|
| PROTOCOL DISCRIMINATOR | 5.4.2 | BOTH | M | 1 |
| CALL REFERENCE | 5.4.3 | BOTH | M | 4 |
| MESSAGE TYPE | 5.4.4.1 | BOTH | M | 2 |
| MESSAGE LENGTH | 5.4.4.2 | BOTH | M | 2 |
| AAL PARAMETERS | 5.4.5.5 | BOTH | O (1) | 4-11 |
| BROADBAND LOW LAYER INFORMATION | 5.4.5.9 | BOTH | O (2) | 4-17 |
| CONNECTION IDENTIFIER | 5.4.5.16 | BOTH | O (3) | 4-9 |
| ENDPOINT REFERENCE | 5.4.8.1 | BOTH | O (4) | 4-7 |
| CALL CORRELATION TAG | | | | 4 |

NOTE 1- INCLUDED IN THE USER-TO-NETWORK DIRECTION WHEN THE CALLED USER WANTS TO PASS ATM ADAPTATION LAYER PARAMETERS INFORMATION TO THE CALLING USER, AND THE ATM ADAPTATION LAYER PARAMETERS INFORMATION ELEMENT WAS PRESENT IN THE SETUP MESSAGE INCLUDED IN THE NETWORK-TO-USER DIRECTION IF THE CALLED USER INCLUDED AN ATM ADAPTATION LAYER PARAMETERS INFORMATION ELEMENT IN THE CONNECT MESSAGE. THE ATM ADAPTATION LAYER PARAMETERS INFORMATION ELEMENT SHALL NOT BE PRESENT WHEN THE ENDPOINT REFERENCE INFORMATION ELEMENT WAS PRESENT IN THE SETUP MESSAGE AND CONTAINED A NON-ZERO VALUE.

NOTE 2- INCLUDED IN THE USER-TO-NETWORK DIRECTION WHEN THE ANSWERING USER WANTS TO RETURN LOW LAYER INFORMATION TO THE CALLING USER. INCLUDED IN THE NETWORK-TO-USER DIRECTION IF THE USER AWARDED THE CALL INCLUDED A BROADBAND LOW LAYER INFORMATION ELEMENT IN THE CONNECT MESSAGE. OPTIONALLY INCLUDED FOR BROADBAND LOW LAYER INFORMATION NEGOTIATION, BUT SOME NETWORKS MAY NOT TRANSPORT THIS INFORMATION ELEMENT TO THE CALLING USER (SEE ANNEX C).

NOTE 3- MANDATORY IN THE NETWORK-TO-USER DIRECTION IF THIS MESSAGE IS THE FIRST MESSAGE IN RESPONSE TO A SETUP MESSAGE. IT'S MANDATORY IN THE USER-TO-NETWORK DIRECTION IF THIS MESSAGE IS THE FIRST RESPONSE TO A SETUP MESSAGE, UNLESS THE USER ACCEPTS THE CONNECTION IDENTIFIER INDICATED IN THE SETUP MESSAGE.

NOTE 4- MANDATORY IN THE ENDPOINT REFERENCE WAS INCLUDED IN THE SETUP MESSAGE.

FIG.5

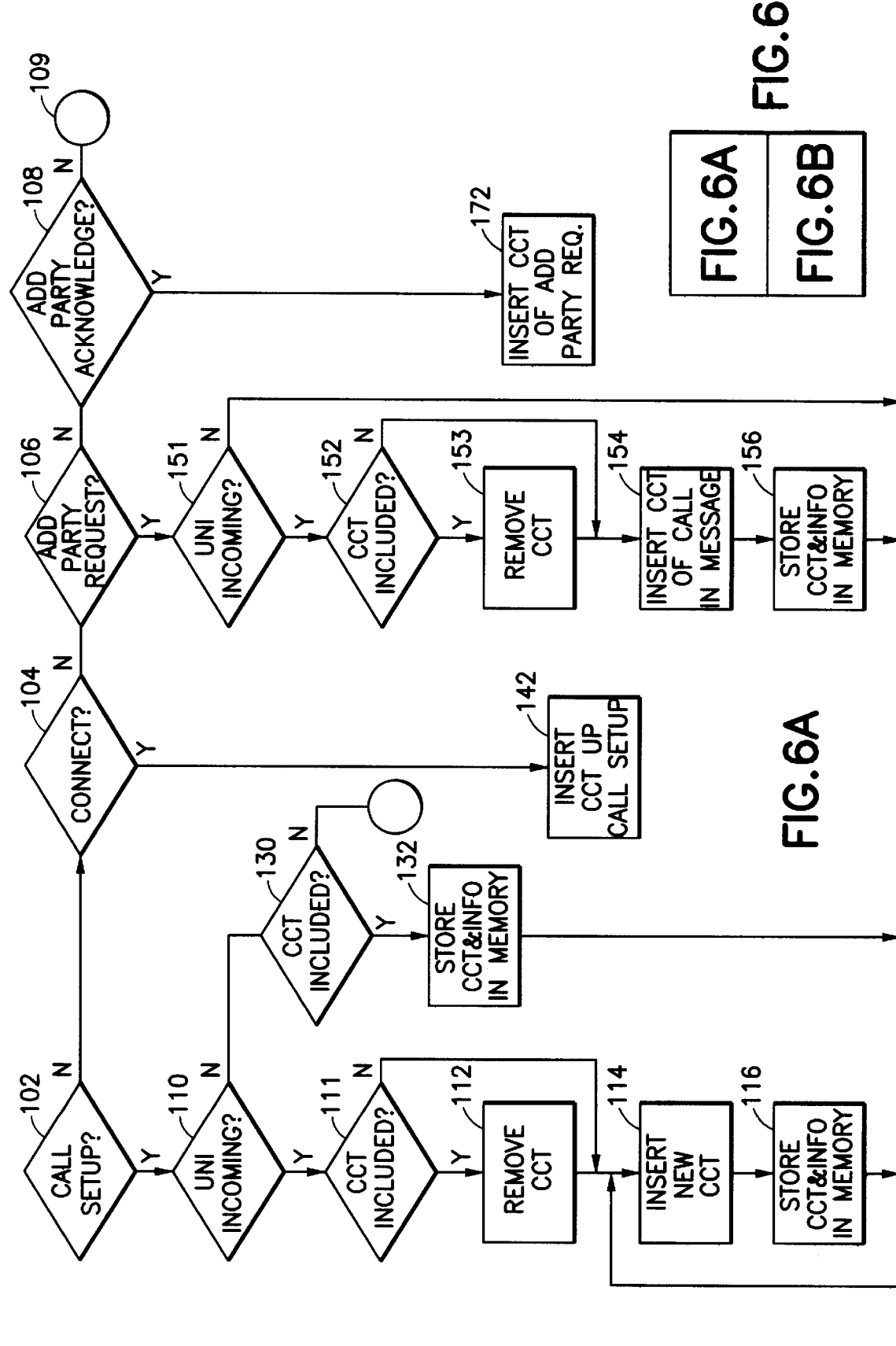

CALL CORRELATION TAG FOR ATM MESSAGES

BACKGROUND OF THE INVENTION

1. Field of the Invention

The present invention relates broadly to telecommunications. More particularly, the present invention relates to means and methods for the collection of information regarding switched virtual circuit (SVC) calls in the ATM telecommunications network. The invention has particular application with respect to information which may be used to produce billing records used to invoice a customer, but is not limited thereto.

2. State of the Art

Perhaps the most awaited, and now fastest growing technology in the field of telecommunications in the 1990's is known as Asynchronous Transfer Mode (ATM) technology. ATM is providing a mechanism for removing performance limitations of local area networks (LANs) and wide area networks (WANs) and providing data transfers at a speed of on the order of gigabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

In order for ATM technology to develop, it must be functional in its own right as well as compatible with existing technology. Thus, a technical group called the ATM Forum which is comprised of numerous corporate representatives has been proposing ATM specifications which are being provided to ANSI and the ITU-T for their consideration and adoption. Details of these specifications may be found in proceedings of the ATM Forum as well as the proceedings of ANSI and the ITU-T. Of particular interest among such documents for purposes herein is a document which is incorporated by reference in its entirety herein and which is entitled "Q.2726.3 Final Text, Broadband ISDN User Part, Network Call Correlation Identifier" under ITU-Telecommunication Standardization Sector Study Group 11, Data Miyazaki, Jan. 29–Feb. 16, 1996. The Q.2726.3 standards document incorporates the present invention which was described by this inventor on or about Jun. 5, 1995 to the ATM Forum, Technical Committee Working Groups (B-ICI, PNNI and Signalling) in Contribution ATMF/95-0632. Of additional interest for the present invention are ITU-T Standards document Q.2931 and ATM Forum specification UNI-3.1 which are hereby incorporated by reference herein in their entireties and relate to the UNI interface, as well as ATM Forum B-ICI Specification Version 2.0 and ITU-T B-ISUP signaling protocols in standards Q.2761, Q.2762, Q.2763, and Q.2764, all of which are hereby incorporated by reference herein in their entireties.

As set forth by the present inventor in the ATM Forum contribution 95-0632, in the specifications for SVC (switched virtual circuit) operation as had then existed, there was an implicit assumption that "usage based billing" could be utilized for SVC services, where "billing" means the collection of information relating to a call which provides details for the overall call rather than simply statistics from one point in the network. One fundamental requirement which had to be met in order to offer "usage based billing" was the ability to uniquely identify a call and the corresponding statistics associated with the call. At that time it was assumed that if a call was placed from a first user site (at a user-network interface site A or UNI A) to a second site (UNI B), both sites would have ATM end system addresses which would uniquely identify the relevant interfaces within the network. Thus, if an end system at the site connected to the network by UNI A made a call to an end system at the site connected by UNI B, then the CALL SETUP message would contain the address of UNI B as the called address and that of UNI A as the calling address. The switches supporting UNI A and UNI B would establish the call and internally maintain some form of call status record which would contain details relating to the call. At the end of the call, the information from the internal call status record would then be transferred to a billing record which could be processed by some form of external billing system. A key feature envisioned by such a system is that data would be collected at different points in the network (e.g., the switch providing UNI A and the switch providing UNI B) regardless of whether ingress or egress counts were to be used for the aggregate billing or statistics record. Of course, the switches could be in different provider networks linked by multiple PNNI and/or B-ICI interfaces.

With the assumed system, an external billing system would be presented with two records from different sources that relate to the same call. The information from those records could then be used in the final composite record. It was assumed that the different billing records from the different sources could be correlated by studying the information that they contained. For example, the called and calling addresses would be saved in each billing record and thus provide a mechanism to relate the records from the different system together. In addition, time stamp information (e.g., start time, duration, etc.) could be used to help relate different billing records together. However, the present inventor recognized that this information is not enough to guarantee that billing information from different sources would be correctly matched up.

In particular, a situation could occur where two calls originated from an end system connected via UNI A at the same time where both calls were destined for an end system connected by UNI B. The two calls would be processed in sequence by UNI A and two entries made in the switch call status table. After transiting the network, the two calls would be processed in sequence by UNI B and terminated to the relevant end system(s). However, it is perfectly possible that the two CALL SETUP messages might take different paths through the network, and thus, the first call processed by UNI A would not necessarily be the first processed by UNI B. This would suggest that timing information relating to call start time in the subsequent billing record could not be used to determine which record matched with which. Moreover, if both calls should happen to terminate at the same time (perhaps due to a link failure), the call duration information would likewise not help in matching billing records. Furthermore, as both calls originated from the same address and were destined for the same address, the address information could not be used to help in matching the subsequent billing records. Clearly, such a situation is not ideal.

SUMMARY OF THE INVENTION

It is therefore an object of the invention to provide apparatus and methods for unambiguously identifying billing records from different ATM switches which relate to the same call.

It is another object of the invention to provide a call correlation tag (CCT) as an information element of a CALL SETUP message at a first user-network-interface which is forwarded to a second user-network interface (UNI), where the call correlation tag may be used for billing purposes.

It is a further object of the invention to provide a CCT as an information element of one or more of a CALL CONNECT, and ADD PARTY REQUEST, and an ADD PARTY ACKNOWLEDGE message at a UNI or at a PNNI (private network—network interface).

It is an additional object of the invention to provide a call correlation tag as a parameter of one or more of an INITIAL ADDRESS message (IAM), and an ANSWER message (ANM) where B-ISUP signalling it utilized such as at a network—network-interface (NNI) within a public network, or at the B-ICI (broadband inter carrier interface) between public networks.

In accord with the objects of the invention which will be discussed in more detail below, the apparatus of the invention generally comprises a processor means adapted for inserting a call correlation tag (CCT) information element (IE) (parameter) into all call initiating messages (e.g., CALL SETUP or INITIAL ADDRESS) of which it is the source. The CCT is unique over a period of time such that two ongoing calls initiated at a particular location cannot have the same call correlation tag. The processor means which inserts the call correlation tag is typically located at a switch or other apparatus at the UNI, and, in accord with the method of the invention, the message with the tag is forwarded through the ATM network towards the destination interface. Preferably, upon receiving the call initiating message with the call correlation tag, the processor means of the destination interface returns a confirmation message (e.g., CONNECT or ANSWER) which is likewise provided with an information element for inserting the identical CCT. Both the source and destination interfaces store the CCT in memory associated with the respective processor means. Relevant information regarding the call including the CCT is forwarded to or obtained by a management (billing) center upon the conclusion of the call or at intervals during the duration of the call.

According to one preferred aspect of the invention, messages related to adding a party (e.g., ADD PARTY REQUEST, ADD PARTY ACKNOWLEDGE) are also provided with an information element for the call correlation tag. Thus, should any parties be added to the call after the call has started, a mechanism is provided for properly associating the parties with the existing call. In this situation, details such as call duration, etc., are typically different for the parties to the call who are joined at different times.

According to another preferred aspect of the invention, the call correlation tag (CCT) assumes the form of four bytes (thirty-two bits) within a call correlation tag IE. In order to guarantee that the CCT is unique, the CCT may be set by the originating switch to be equal to the internal CALL REFERENCE VALUE assigned by the originating switch to the call. Alternatively, a thirty-two bit counter may be utilized to sequentially assign a CCT to a call, with all CCTs in use being stored, and CCTs related to completed calls being available for reuse.

Additional objects and advantages of the invention will become apparent to those skilled in the art upon reference to the detailed description taken in conjunction with the provided figures.

BRIEF DESCRIPTION OF THE DRAWINGS

FIG. 3 is a diagram of a level 3 packet format for a UNI 3.1 CALL SETUP message showing the incorporation of the call correlation tag IE according to the invention.

FIG. 5 is a diagram of a level 3 packet format for a UNI 3.1 CALL CONNECT message according to the preferred embodiment of the invention.

DETAILED DESCRIPTION OF THE PREFERRED EMBODIMENT

Figure 1:
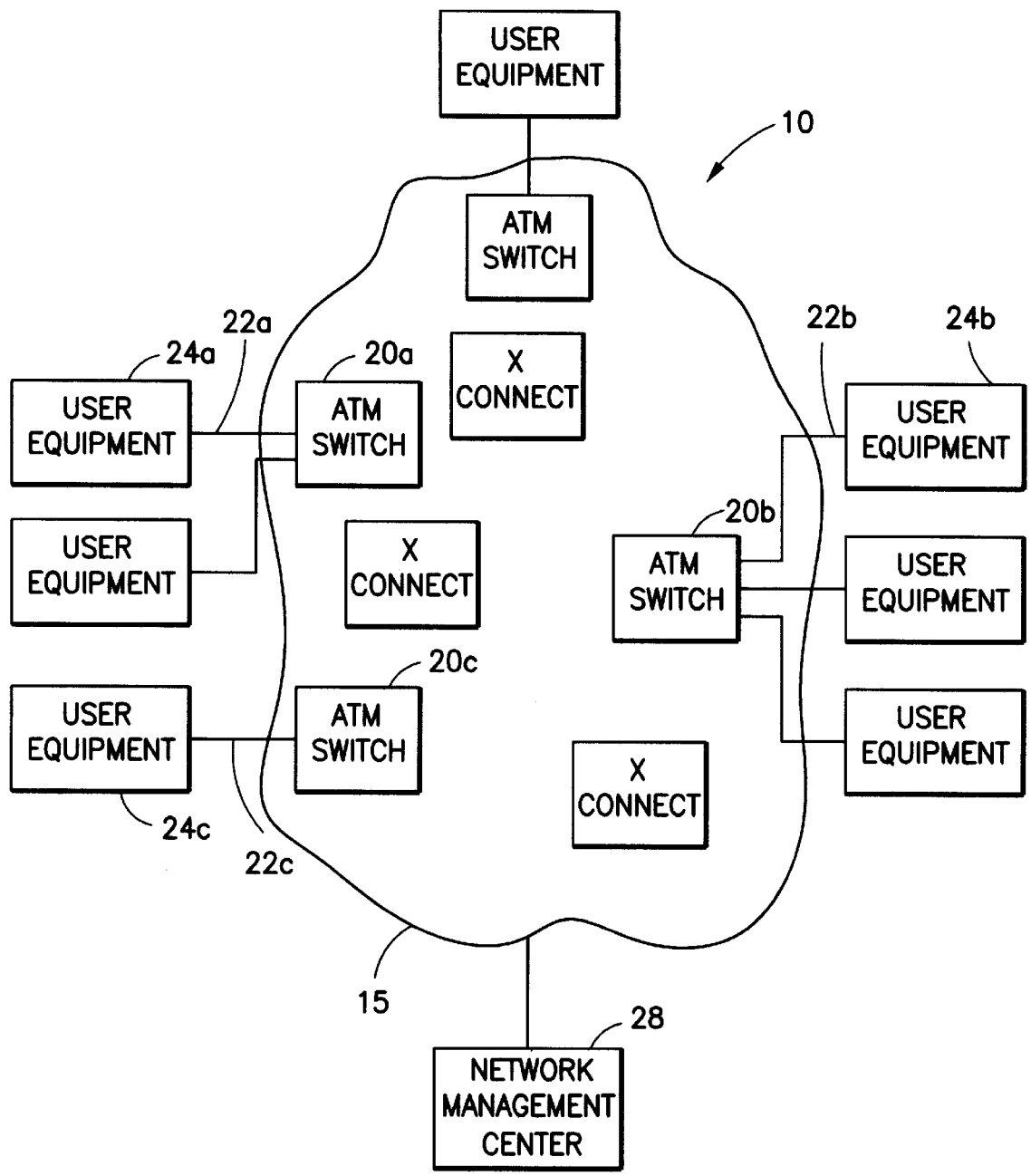
FIG. 1 is a high level diagram of a telecommunications network incorporating a management center, ATM switches, and user equipment in accord with the invention.

Turning to FIG. 1, a high level diagram of a telecommunications network 10 is seen. The telecommunications network as shown includes an "ATM Network" cloud 15, a plurality of ATM switches 20a, 20b, 20c which are at the ATM network side of the User-Network-Interfaces (UNIs) 22a, 22b, 22c, . . . , user equipment 24a, 24b, 24c . . . , and a network management center 28. As will be well understood by those skilled in the art, when a first user, e.g., 24a wishes to establish contact with another user, e.g., 24b, the first user 24a places a call by sending out a well defined call initiation message such as CALL SETUP. The initiation message is transferred via a UNI (e.g., 22a) to an ATM switch (e.g., 20a) which, as the "source" switch processes the message as discussed in more detail below, and routes (switches) the message appropriately. Once in the ATM network 15, the message is routed (via intermediate switches within the ATM cloud) to the destination switch (e.g., 20b), which forwards the message to the second user. In response to the initiation message, the second user provides a well defined confirmation message such as CONNECT. When the CONNECT message is received by the first user, a connection is established for the call to proceed.

Figures 2, 4:
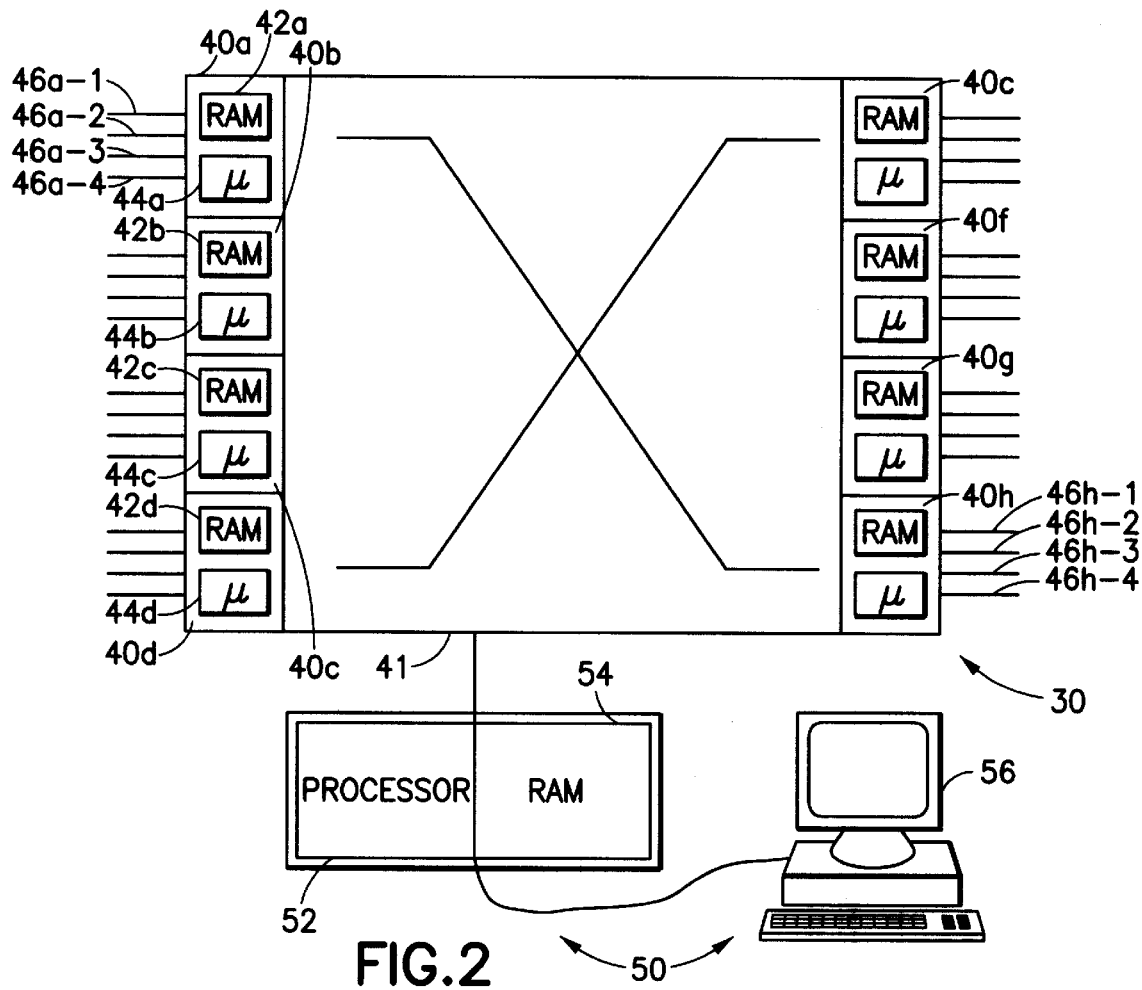
FIG. 2 is a high level diagram of an embodiment of an ATM switch with a processor means adapted for inserting a call correlation tag information element into a call initiating message in accord with the invention.
FIG. 4 is a diagram of one preferred format of the call correlation tag IE of FIG. 3.

A high level diagram of a preferred ATM switch 20 is seen in FIG. 2. The switch equipment is typically complex equipment generally known to those skilled in the art. According to a preferred embodiment of the invention, the switches are APEX switches which are commercially available from General DataComm, Inc. of Middlebury, Conn., although other switches could be utilized. As seen in FIG. 2, the switch 20 is provided with eight data processing modules or "slots" 40a–40h and a cross-connect switch 41 being provided. Each module 40 includes a memory element or RAM 42a–42h, and a processing element (slot controller) or microprocessor 44a–44h, and supports four ports (links) 46a-1, 46a-2, 46a-3, 46a-4, 46b-1, . . . 46h-4. In addition, as indicated in FIG. 2, an external workstation 50 with its own processor 52, memory 54, and terminal 56 may be coupled to the APEX switch 41 for loading configuration and other information into the switch, and for receiving diagnostic and other information from the switch. It will be appreciated that the workstation 50 can be a SPARC workstation commercially available by Sun Microsystems of Cupertino, Calif. or the like.

According to a preferred aspect of the invention, the switches 20 of the invention are designed to substantially meet broadband ISDN protocol and conform to the specifications of the ITU-T as well as the ATM Forum specifications. Thus, incoming calls which are to be routed by the source switch are typically formatted as level 3 messages which sit atop a signalling ATM Adaptation Layer (SAAL) and the physical layer interface (e.g., ATM, DS1, DS3, OC3, E1, E3). The preferred format of a level 3 SETUP message is seen in FIG. 3, with several "information elements", some of which are mandatory, and some of which are optional according to the Standards and Recommendations. The first information element (IE) is the one byte protocol discriminator, which for a CALL SETUP message has a value of 00001001 according to Section 5.4.2 of the UNI Specification 3.1.

According to the invention, and as seen in FIG. 3, a "Call Correlation Tag" or "CCT" information element is added by the source node to the level 3 CALL SETUP request of the caller. In a preferred embodiment of the invention, and as seen in FIG. 4, the CCT IE has an IE identifier field of desired length based on the protocol of interest, and a CCT value which is preferably four bytes (thirty-two bits) in length. While different mechanisms for selecting the value for the thirty-bit CCT can be utilized, in accord with a first embodiment, in order to guarantee that the CCT is unique (i.e., that the combination of the called number, calling number, and CCT will uniquely identify the call), the CCT is set by the originating switch to be equal to the internal CALL REFERENCE value assigned by the originating switch to a particular call. In a second embodiment, a thirty-two bit counter is utilized by the processor means of the originating switch to sequentially assign CCTs to calls, with all CCTs in use being stored for reference, and CCTs related to completed calls being available for reuse after an assigned period of time.

Before turning to details of how the processor means (e.g., microprocessors 44a, 44b, . . . ) generate and process the call correlation tag, it should be appreciated that the call correlation tag is usefully included in a call acknowledgement message (CONNECT) as well as the call initiation message. Thus, as seen in FIG. 5, a level 3 packet format for a CALL CONNECT message based on UNI Specification 3.1 is provided with a CCT IE according to the preferred embodiment of the invention. As set forth below, the CCT provided in the CONNECT message (by the destination switch) should be the identical CCT provided by the source switch in the CALL SETUP message for any given call.

It should also be appreciated that other message such as ADD PARTY REQUEST and ADD PARTY ACKNOWLEDGE (as defined in UNI 3.1) are also preferably provided with a CCT IE. Thus, the unique CCT will accompany any information regarding the parties which are added to the call, and all relevant information for a call can be determined based on the unique CCT by the billing management center.

Figure 6B:
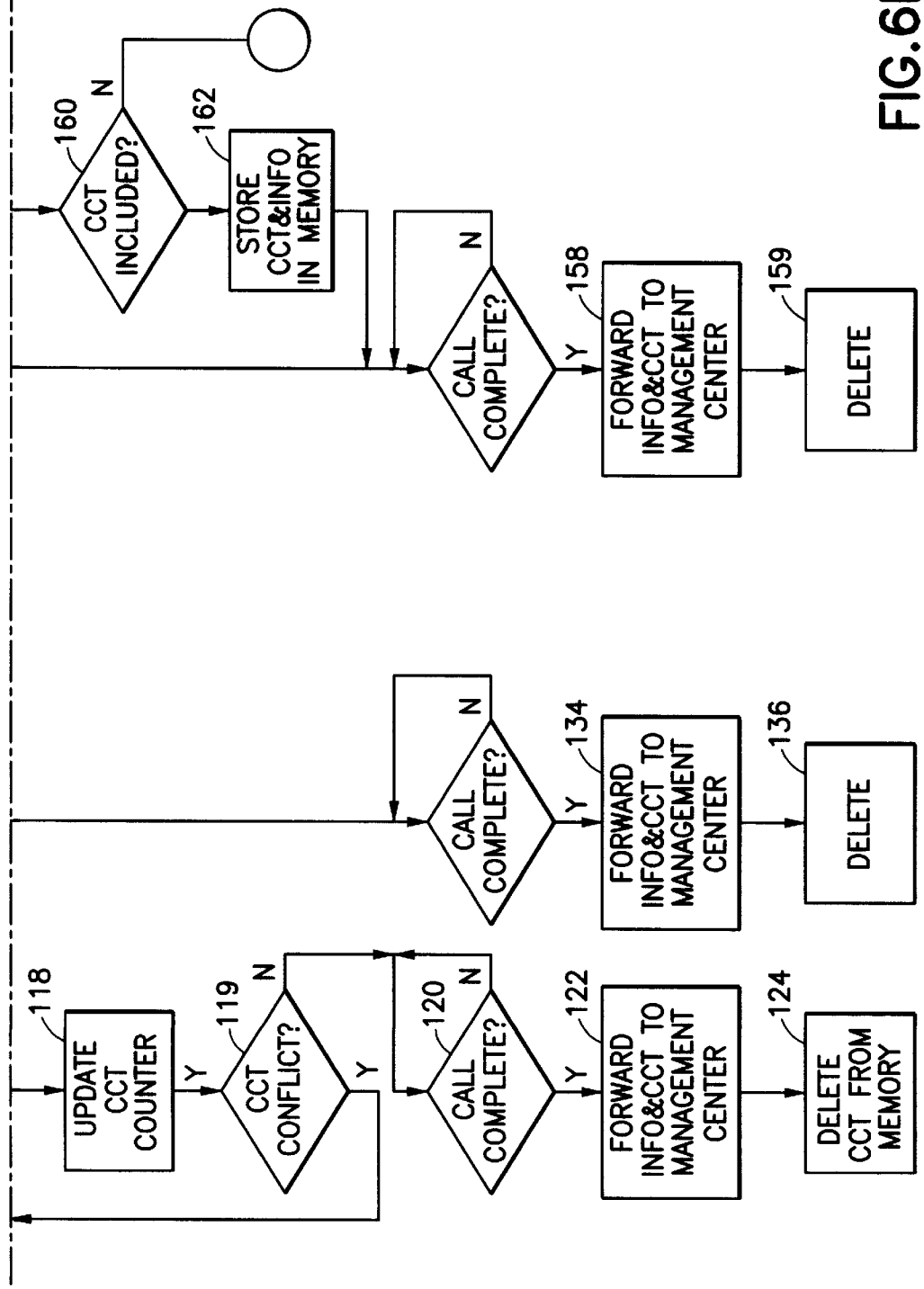
FIG. 6 is a flow chart of the software used by the processor means of FIG. 2 in generating and inserting the call correlation tag into CALL SETUP, CONNECT, and other messages, and in sending relevant call information with the call correlation tag to a management center for billing purposes.

Turning now to FIG. 6, a flow chart of the software used by each of the processor means 44a, 44b, . . . of FIG. 2 is seen for generating and inserting the call correlation tag into CALL SETUP, CONNECT, and other messages, and in sending relevant call information with the call correlation tag to a management center for billing purposes. It should be appreciated that the software indicated by FIG. 6 is only a small portion of the software used by the processor means; but it is the portion relevant to the issues of the call correlation tag. Thus, as seen in FIG. 6, at 102, 104, 106, and 108 the processor determines whether a CALL SETUP message, a CONNECT message, and ADD PARTY REQUEST, or an ADD PARTY ACKNOWLEDGE is being received. If not, at 109 the processor processes the incoming message in accord with techniques of the prior art. However, if, at 102 a CALL SETUP message is received, the processor checks at 110 to see whether the message is a UNI incoming message (i.e., from the user equipment). If the CALL SETUP message is a UNI incoming message, the processor checks to see at 111 whether the message contains a call correlation tag. If it does, the processor removes the existing tag at 112, and inserts a new tag at 114. The new CCT is generated either by inserting the CALL REFERENCE value of the call from the signalling protocol for the interface, or by sequentially generating a thirty-two bit value (with care being taken by multiple processors to avoid duplication; e.g., by designating values for certain bits for different processors). Upon assigning a CCT to a call, the processor at 116 preferably stores the value of the CCT in memory along with other information regarding the call (e.g., the called and calling numbers found in the SETUP message). In addition, at 118, in the case of sequential generation, the processor updates (increments) a CCT counter associated with the processor so that upon receipt of another call, a different CCT may be assigned for that call. The assigned CCT is preferably checked at 119 against the CCT values of ongoing calls stored in memory to avoid conflict. If there is a conflict, a new CCT is assigned for the call. Upon completion of the call at 120, the relevant information regarding the call (e.g., length of time measured either by determining start and stop times or by running a clock; the called and calling numbers; the number of ATM cells sent; etc.) and the CCT of the call can be forwarded at 122 to the network management center. The CCT value for the completed call which was stored in memory is then (or at a given interval after call completion) removed at 124 so that the value may be reused after a suitable delay. It is noted that relevant information regarding the call may also be requested by the network management center and forwarded to the network management center at regular intervals even while the call is continuing.

Returning to step 111, if the CALL SETUP message is not an incoming UNI message, but is an outgoing UNI message (i.e., is received from the network), at 130 the processor checks that the SETUP message received from the network has a CCT. At 132, it stores the CCT value along with other information relating to the call (e.g., the called and calling numbers) in a local call information record in memory. If desired, the processor may pass the CCT across the UNI to a destination user equipment. Regardless, at regular intervals, and/or upon completion of the call, at 134 the processor forwards information relating to the call (e.g., number of ATM cells received, called and calling numbers, etc.) along with the CCT value to the network management center. Upon forwarding the CCT value, or at some time thereafter, the processor at 136 deletes from memory the information which was stored at 132.

After an outgoing UNI CALL SETUP message is received, and returning now to step 104, if the processor determines that a CONNECT message related to that CALL SETUP message is being received from an incoming UNI (e.g., by comparing the CALL REFERENCE values in the CALL SETUP and CONNECT messages assigned by that processor for that call), the processor at 142 inserts the CCT of the CALL SETUP message into the CALL CONNECT message.

It is noted that switches in the network through which a CALL SETUP or CONNECT message transits, but which do not have UNI interfaces should pass the CCT through the switch without modification of the CCT; although one or more other IEs such as the CALL REFERENCE value may be modified by the switch. If desired, each switch may store the CCT value as part of the status information held for an active call.

Returning to step 106, if an ADD PARTY REQUEST message is received, at 151 a determination is made whether the message is an incoming UNI message or an outgoing UNI message. If it is an incoming UNI message, at 152 the processor checks to see whether the ADD PARTY message contains a CCT. If it does, at 153, the existing CCT is removed. If the ADD PARTY REQUEST message does not contain a CCT, at 154, the processor inserts the CCT already in use for the call. At 156, the CCT value is stored along with other information relating to the call (e.g., called and calling party numbers) in the local call information record. Upon completion of the call or at desired intervals, the processor at 158 forwards information relating to the call (e.g., number of ATM cells received, called and calling numbers, etc.) along with the CCT value to the network management center. When the call is completed and the information sent, the information which was stored at 156 may be deleted from memory at 159.

If the ADD PARTY REQUEST is an outgoing UNI message, then at 160, the processor checks that the ADD PARTY REQUEST message received from the network contains a CCT. At 162, the CCT value is stored along with the other information relating to the call in a local information record memory. If desired, the CCT can be passed through the UNI to the destination end user equipment.

Where an ADD PARTY REQUEST is received in an outgoing UNI message, it may be desirable to insert the CCT into an ADD PARTY ACKNOWLEDGE message. Thus, at 108, if an ADD PARTY ACKNOWLEDGE message is received as an incoming UNI message, if the processor determines that the ADD PARTY ACKNOWLEDGE message is related to that ADD PARTY REQUEST received from the network, the processor inserts into the ADD PARTY ACKNOWLEDGE message at 172 the CCT which was sent in the ADD PARTY REQUEST.

There have been described and illustrated herein apparatus and methods for appending call correlation tags to ATM call initiation messages. While particular embodiments of the invention have been described, it is not intended that the invention be limited thereto, as it is intended that the invention be as broad in scope as the art will allow and that the specification be read likewise. Thus, while the invention has been described with particular reference to the APEX switch of General DataComm, Inc. and to other hardware, it will be appreciated that other switches and hardware arrangements could be utilized. Thus, instead of utilizing a switch with a plurality of slot processors, a single internal processor could be utilized to control the switch and provide the CCTs for the incoming CALL SETUP messages, or an external processor could be utilized. Likewise, it will be appreciated by those skilled in the art that while the invention has been described with particular reference to UNI signalling which utilizes CALL SETUP, CONNECT, and ADD PARTY messages, the same principles regarding the insertion of call correlation tags into messages applies to B-ISUP signaling which uses messages such as INITIAL ADDRESS, ANSWER, and ADD CALL. Only details such as format which are dictated by the different standards will change. It will therefore be appreciated by those skilled in the art that yet other modifications could be made to the provided invention without deviating from its spirit and scope as so claimed.

I claim:

1. An apparatus in an ATM telecommunications network, comprising:

a) means for receiving a first call initiating message from an interface of the ATM telecommunications network, said first call initiating message having a plurality of first information elements;

b) processor means adapted for providing and inserting a first call correlation tag as one of said plurality of first information elements, said first call correlation tag being related to a first call initiated by said first call initiating message and being unique while said first call is in progress.

2. An apparatus according to claim 1, further comprising:

memory means for storing said first call correlation tag in association with first other information regarding said first call related to said first call initiating message.

3. An apparatus according to claim 2, further comprising:

means for forwarding said first call correlation tag with said first other information to a billing management means.

4. An apparatus according to claim 1, wherein:

said processor means assigns a CALL REFERENCE value to all calls being handled by said apparatus, and said first call correlation tag is set equal to said CALL REFERENCE value.

5. An apparatus according to claim 4, wherein:

said first call correlation tag is four bytes in length.

6. An apparatus according to claim 1, wherein:

said apparatus is an ATM switch at a user-network-interface (UNI) of the ATM telecommunications network, and said first call initiating message is a CALL SETUP message.

7. An apparatus according to claim 1, wherein:

said apparatus is an ATM switch at a public network—network interface or a broadband inter carrier interface, and said first call initiating message is an INITIAL ADDRESS message.

8. An apparatus according to claim 2, wherein:

said first other information includes a called number and a calling number.

9. An apparatus according to claim 1, further comprising:

means for receiving a second call initiating message from said ATM telecommunications network, said second call initiating message having a second call correlation tag, and means for forwarding said second call correlation tag with second other information to said memory means.

10. An apparatus according to claim 9, further comprising:

means for receiving a first call confirmation message from an interface of the ATM telecommunications network, said first call confirmation message having a plurality of second information elements, and said first call confirmation message being related to said second call initiating message wherein, said processor means is further adapted to insert said second call correlation tag into one of said second information elements of said first call confirmation message.

11. A telecommunication system, comprising:

a) an ATM network having a plurality of switch means;

b) first user equipment;

c) second user equipment;

d) first network-interface means coupling said first user equipment to a first of said plurality of switch means;

e) second network interface means coupling said second user equipment to a second of said plurality of switch means, wherein said first of said plurality of switch means including first means for receiving a first call initiating message from said first user equipment via said first network-interface means, first processor means coupled to said first means for receiving, and first memory means coupled to said first processor means, said first call initiating message having a plurality of first information elements, said first processor means adapted for providing and inserting a first call correlation tag as one of said plurality of first information elements, said first call correlation tag being related to a first call initiated by said first call initiating message and being unique while said first call is in progress, and said first memory means for storing said first call correlation tag in associated with first other information regarding said first call, said second of said plurality of switch means includes second means for receiving said first call initiating message with said first call correlation tag from said first of said plurality of switch means via said ATM network, and second memory means for storing said first call correlation tag with second other information regarding said first call.

12. A telecommunications system according to claim 11, further comprising:

billing management means coupled to said ATM network, wherein said first of said plurality of switch means includes first means for forwarding said first call correlation tag with said first other information to said billing management means, and said second of said plurality of switch means includes second means for forwarding said first call correlation tag with said second other information to said billing management means.

13. A telecommunications system according to claim 11, wherein:

said first processor means assigns a CALL REFERENCE value to all calls being handled by said first of said plurality of switch means, and said first call correlation tag is set equal to said CALL REFERENCE value.

14. A telecommunications system according to claim 13, wherein:

said first call correlation tag is four bytes in length.

15. A telecommunications system according to claim 11, wherein:

said first network-interface means is a user-network interface (UNI) means, and said first call initiating message is a CALL SETUP message.

16. A telecommunications system according to claim 11, wherein:

said first network-interface means is a public network—network-interface or a broadband inter carrier interface, and said first call initiating message is an INITIAL ADDRESS message.

17. An apparatus according to claim 12, wherein:

said first other information includes a called number and a calling number, and said second other information includes said called number and said calling number.

18. An apparatus according to claim 17, wherein:

said first other information includes a number of ATM cells sent during said call.

19. A method for the collection of information regarding switched virtual circuit calls in an ATM telecommunications network, comprising:

a) inserting a unique call correlation tag as an information element of a call initiating message being sent from a first switch means to a second switch means;

b) at the first switch means, storing the call correlation tag with first other information of a call relating to the call initiating message;

c) at the second switch means, storing the call correlation tag with second other information of the call relating to the call initiating message; and d) after the call is terminated, sending said call correlation tag with said first other information and said call correlation tag with said second other information to billing management means.

20. A method according to claim 19, wherein:

the first switch means assigns a CALL REFERENCE value to all calls being handled by the switch means, and said method further comprises setting the call correlation tag to a value equal to the CALL REFERENCE value.

* * * * *